United States Patent [19]

Gill et al.

[11] 3,804,271
[45] Apr. 16, 1974

[54] LOADING APPARATUS FOR A CABLE STRANDING MACHINE

[75] Inventors: Ronald Yaxley Gill, Illford Essex; William George Cook, London, both of England

[73] Assignee: International Standard Electric Corporation, New York, N.Y.

[22] Filed: Aug. 2, 1971

[21] Appl. No.: 168,476

Related U.S. Application Data

[62] Division of Ser. No. 26,383, April 7, 1970, Pat. No. 3,618,799.

[52] U.S. Cl............................................. 214/16.4 R
[51] Int. Cl................................................ B65g 1/06
[58] Field of Search......... 214/16.4 R, 16 B, 16.4 A

[56] References Cited
UNITED STATES PATENTS

| | | | |
|---|---|---|---|
| 3,139,994 | 7/1964 | Chasar | 214/16.4 A |
| 3,182,823 | 5/1965 | Chasar | 214/16.4 A |
| 3,240,365 | 3/1966 | King | 214/16.4 A |
| 3,297,379 | 1/1967 | Artaud et al. | 214/16.4 A |
| 3,395,815 | 8/1968 | Johnson | 214/16.1 A |
| 3,608,749 | 9/1971 | Zollinger | 214/16.4 A |
| 3,709,384 | 1/1973 | Williamson | 214/16.4 R |

*Primary Examiner*—Gerald M. Forlenza
*Assistant Examiner*—R. B. Johnson
*Attorney, Agent, or Firm*—John T. O'Halloran; Menotti J. Lombardi; Edward Goldberg

[57] ABSTRACT

A loading apparatus is mechanized to load conductor bobbins onto a cable stranding machine. The apparatus includes a wheeled base, an axle rigidly attached to the base, a platform rotatably mounted about said axle, a retractable hydraulic arm, one end of which is pivotally mounted on the platform, an actuating means for the hydraulic arm and means for rotating the platform. The actuating means includes a guide rigidly mounted on the platform and a linkage coupled to the guide for imparting lifting, lowering, extending and retracting motions to the arm. The apparatus is supplied with a scoop at a periphery of the platform and a holding bar at the end of the arm to lift up a bobbin while the holding bar presses the bobbin against the scoop. The apparatus may be adapted to load two or more bobbins simultaneously. Full bobbins are located in a storage rack running parallel with a carriage in the stranding machine and the loading apparatus is positioned between the rack and the carriage to automatically unload empty bobbins from the carriage and replace them with full bobbins from the rack.

5 Claims, 8 Drawing Figures

LOADING APPARATUS FOR A CABLE STRANDING MACHINE

The present application is a division of previous application Ser. No. 26,383 filed Apr. 7, 1970 now U.S. Pat. No. 3,618,799 granted Nov. 9, 1971.

BACKGROUND OF THE INVENTION

1. Field of the Invention

This invention relates to a loading apparatus, and more particularly, to a loading apparatus for automatically loading full bobbins and unloading empty bobbins from a plurality of bobbin carriages arranged to supply conductors to a cable stranding machine.

2. Description of the Prior Art

Generally, heretofore, manual methods have been relied on in loading and unloading bobbins from bobbin carriages arranged to supply a plurality of conductor wires to a cable stranding machine. Whether empty or full, the bobbins used to supply conductor wires are bulky, heavy and cumbersome to handle. Thus, the operation of loading the bobbins onto the carriages has required time consuming and heavy manual labor and added a substantial cost to the manufacturing of the cable.

SUMMARY OF THE INVENTION

It is therefore the main object of the present invention to mechanize the loading operation of bobbins to the bobbin carriages that supply conductors to a cable stranding machine. It is another object of the present invention to automate the loading operation of the bobbins.

In accordance with the present invention, there is provided a loading apparatus which comprises a base, an axle rigidly attached to the base, a platform rotatably mounted about the axle, a retractable hydraulic arm, an actuating means including a guide and a linkage, and means for rotating the platform about the axle. The hydraulic arm includes a first section pivotally mounted to the platform and a second section coupled to the first section such that it can be extended or retracted toward the first section. Lifting, lowering, retracting, and extending motions of the hydraulic arm are imparted through the linkage, one end of which is coupled to the second section and the other end is slidably coupled to the guide rigidly mounted on the platform. The rotating means is arranged to rotate the entire platform about the axle and thereby imparts rotary movement to the hydraulic arm. The loading apparatus unloads empty bobbins from the cable stranding machine carriage and replaces them with full bobbins from storage racks parallel to the carriage.

It is a feature of the present invention to mount the entire loading apparatus on wheels so that the apparatus can be readily transported.

It is another feature of the present invention to provide a scoop and a holding bar. The scoop is adapted to scoop up a bobbin and is mounted at a periphery of the platform in such a position that when the loading apparatus is wheeled toward the bobbin the scope is ready to lift out the latter. The holding bar is attached transverse to the hydraulic arm at its end so that the arm can be maneuvered to bring the holding bar against the bobbin to provide a gripping force.

The foregoing and other objects and features of the present invention may be more fully apprehended from the following detailed description of the preferred embodiments in conjunction with the drawings.

DETAILED DESCRIPTION OF THE PREFERRED EMBODIMENT

Figure 1:
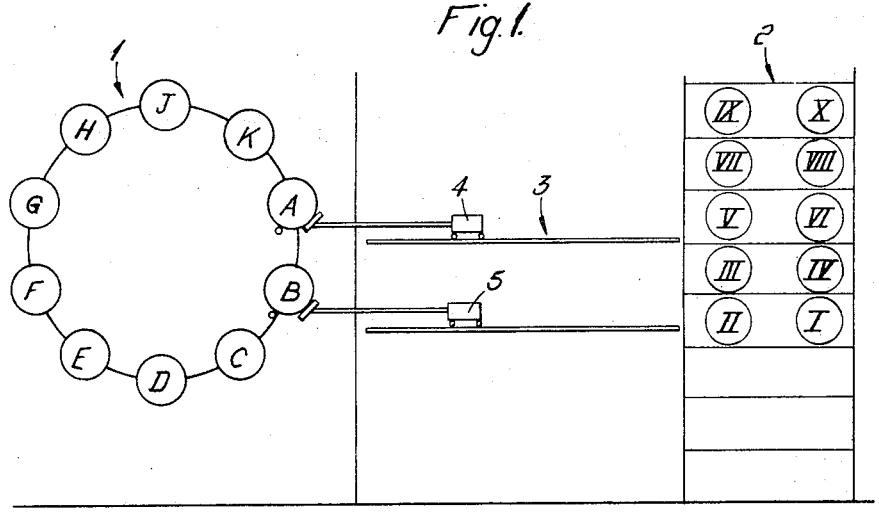
FIG. 1 shows an arrangement according to one embodiment of the invention with the transfer device in one position.
Figure 2:
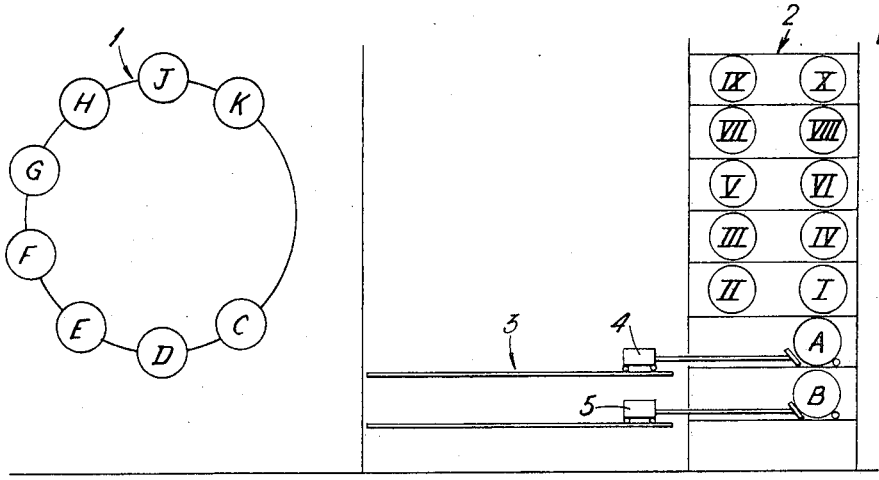
FIG. 2 shows the arrangement of FIG. 1 with the transfer device in a second position.
Figure 3:
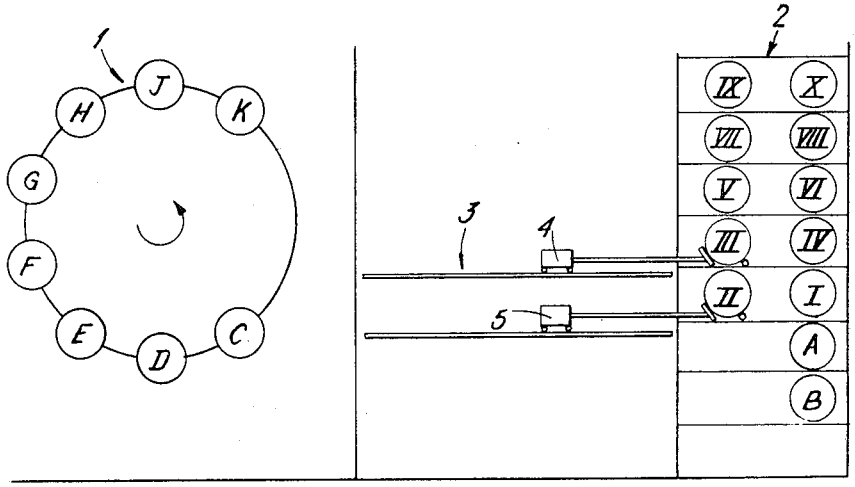
FIG. 3 shows the arrangement of FIG. 1 with the transfer device in a third position.

Referring firstly to FIGS. 1 to 3, a stranding machine carriage 1 is shown having ten bobbins A, B, C, D, E, F, G, H, J and K. A storage rack in the form of a stillage 2 contains 10 full bobbins I to X, and a bobbin transfer device 3 has two trolleys 4 and 5.

Empty bobbins A and B are removed by trolleys 4 and 5 respectively, as shown in FIG. 1, and taken to the stillage 2 as shown in FIG. 2. The bobbin transfer device 3 is then raised such that trolleys 4 and 5 are opposite full bobbins III and II respectively; these full bobbins are then taken to carriage 1, and put in the cages of the carriage 1 originally occupied by empty bobbins A and B.

The carriage 1 is then rotated through 72°, in the direction shown by the arrow and empty bobbins C and D removed from the carriage 1 and taken to the stillage 2. Full bobbins I and IV are then removed from the stillage 2 and taken to the carriage 1. This sequence of operation is continued until all empty bobbins are in the stillage 2, and all full bobbins are in the carriage 1.

Figure 4:
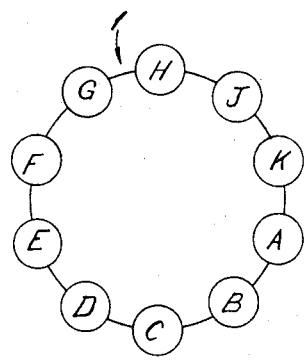
FIG. 4 shows an arrangement according to a second embodiment of the invention with the transfer device in a first position.
Figure 4:
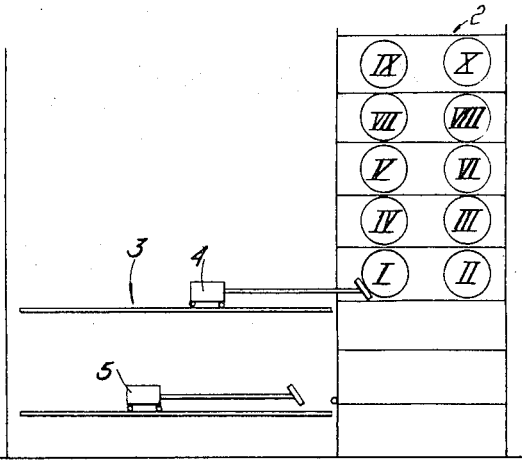
Figure 5:
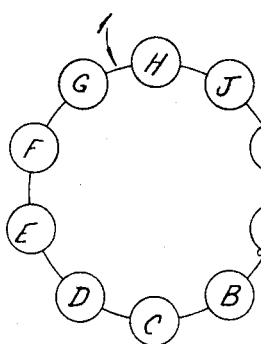
FIG. 5 shows the arrangement of FIG. 4 with the transfer device in a second position.
Figure 5:
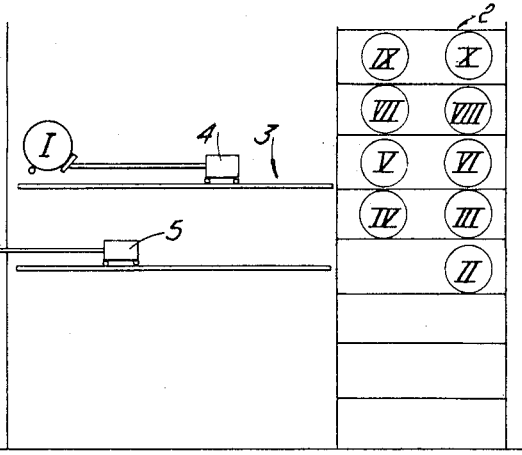
Figure 6:
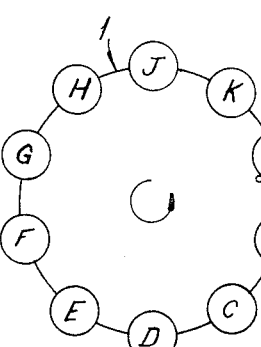
FIG. 6 shows the arrangement of FIG. 4 with the transfer device in a third position.
Figure 6:
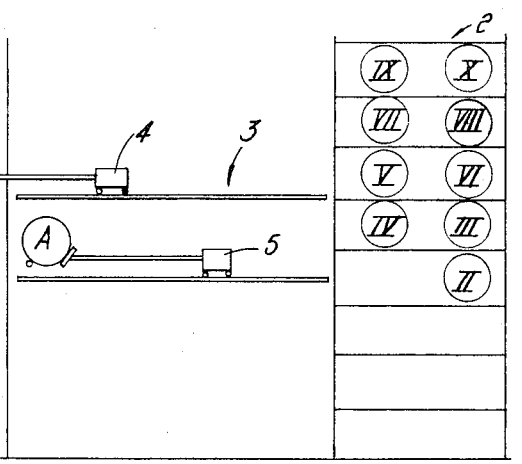

In the arrangement shown in FIGS. 4 to 6, one empty bobbin is removed from the carriage 1 whilst at the same time one full bobbin is removed from the stillage 2. In FIG. 4 the trolley 4 is shown taking full bobbin I from the stillage 2. The transfer device 3 is then raised such that the trolley 5 is adjacent to the empty bobbin A (FIG. 5) which is then taken from the carriage 1. The carriage 1 is then rotated by 36° in the direction shown by the arrow, such that full bobbin I is adjacent to the cage previously occupied by empty bobbin A and it is then loaded into this cage. The transfer device 3 is then lowered and empty bobbin A placed in the stillage 2, whilst full bobbin II is taken from the stillage 2. Empty bobbin B is then taken from the carriage 1, the carriage is indexed through 36° as before, and the full bobbin II is loaded into the cage previously occupied by empty bobbin B. This sequence is continued until all empty bobbins are in the stillage 2, and all full bobbins are in the carriage 1.

The carriage drive is designed so that for loading purposes the carriage 1 can be rotated in known movements to accurately position the bobbins at a known height above the floor level. This operation is carried out automatically in conjunction with the operation of the bobbin transfer device 3.

Each bobbin is retained in a cage of the carriage 1 by means of one fixed and one movable ball-bearing pintle. The movable pintle is automatically operated by the bobbin transfer device 3 to open or close the pintle in order to release or retain a bobbin, and has an interlocking arrangement to prevent incorrect operation. The fixed bobbin ball-bearing pintles have a braking system to provide, and are controlled by, constant preset tension in the wire during stranding.

The selection of bobbins from the stillage 2. operation of the bobbin transfer device 3, and rotation of the carriage 1 during loading is controlled by punched tape, magnetic tape sequence switching or any other suitable means. Facilities are also provided for manual push-button control in order to provide complete flexibility in cases of emergency.

The bobbin transfer device 3 consists of a powered trolley running in a captive manner between the stillages 2 and the stranding machine and controlled accurately to adopt the required positions. The powered trolley has means for elevating tables to predetermined heights in order to suit the stillages or stranding machine loading heights, and means for adopting predetermined positions along the length of the machine. The tables are provided with means, previously described as trolleys 4 and 5, for removing the bobbins either singly or multiply from the stillage and transferring them to a particular position relative to the carriage in the correct sequence, and also operating the movable pintles. It is also possible to use these arrangements in such a manner that all the empty bobbins are first removed from the carriage, and then full bobbins are loaded into the carriage. In addition, it is also possible that bobbins of two or more adjacent carriages could be unloaded or loaded simultaneously.

Figure 7:
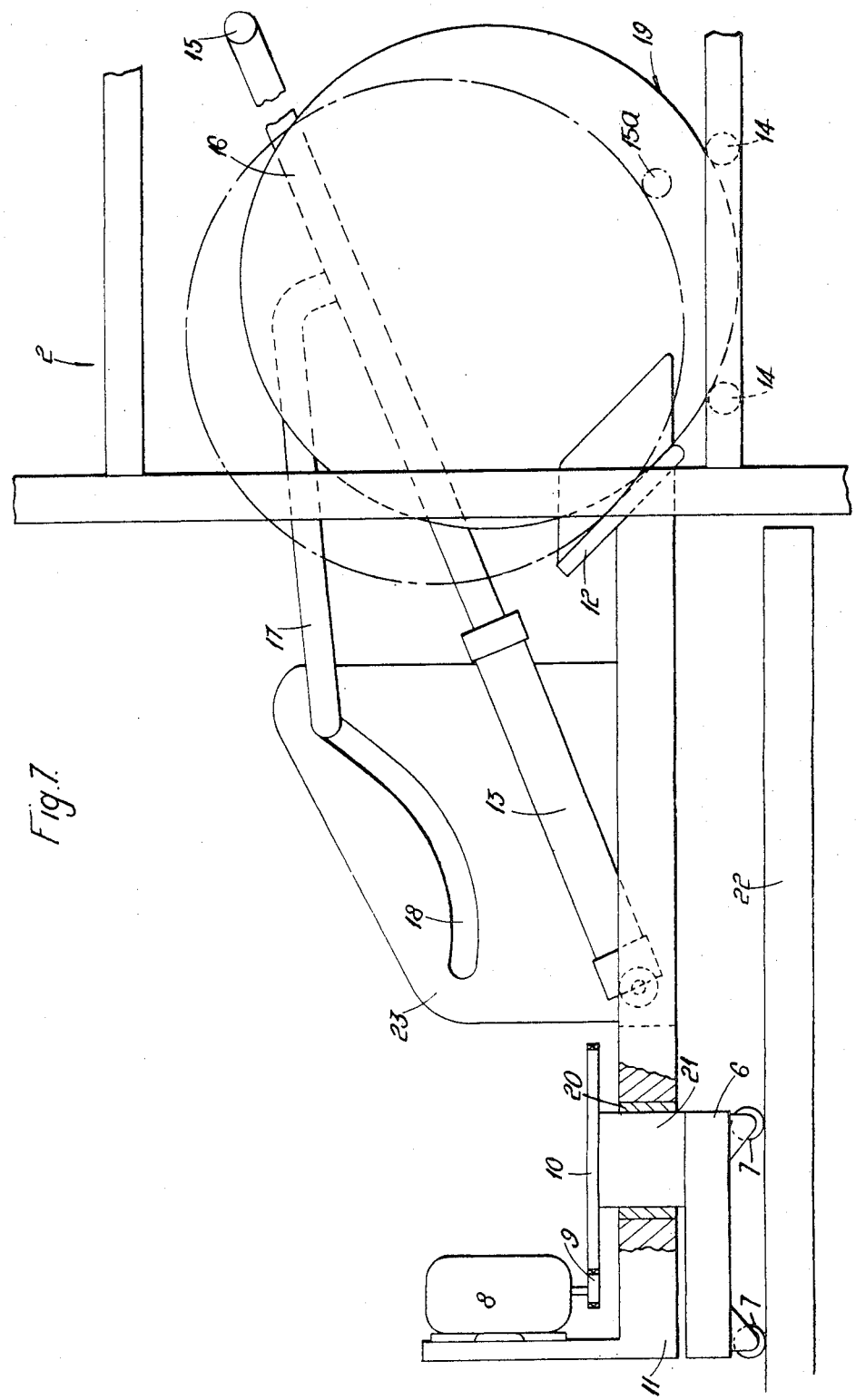
FIG. 7 shows a side view of one example of a bobbin transfer device.
Figure 8:
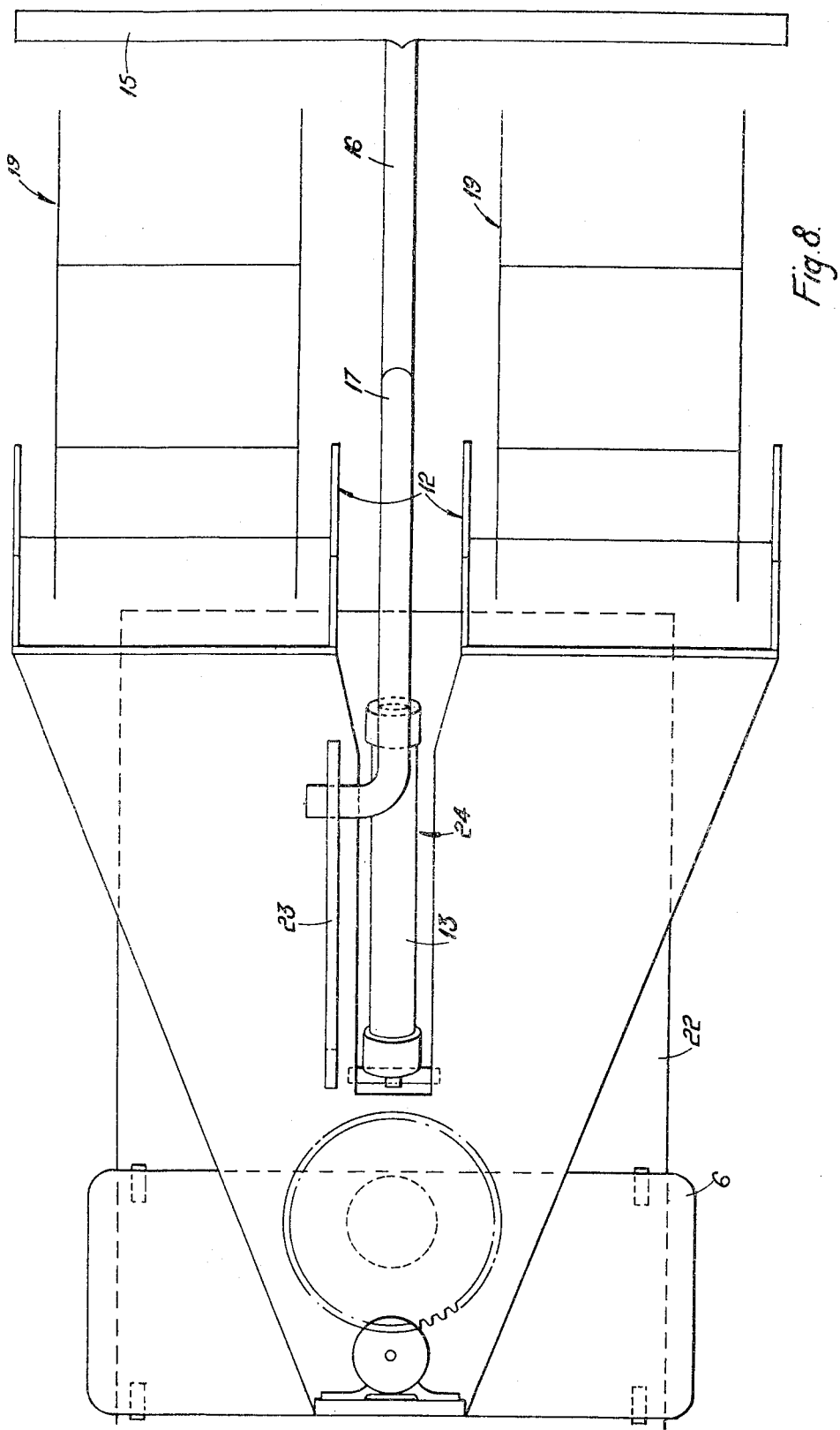
FIG. 8 shows a plan view of the device of FIG. 7.

One form of trolley 4 is shown in FIGS. 7 and 8. This trolley is designed to carry two bobbins, and comprises a base 6, with wheels 7, which runs on table 22. Rigidly attached to the base 6 is an axle member 21 supporting a gear 10 which is rigidly attached to it. Platform member 11 is rotatable about axle member 21 on a bush 20, being driven by an electric motor 8 via a gear 9 which intermeshes with gear 10. Attached to the platform member 11, at its end opposite to the electric motor, are two scoops 12 which partially support bobbins 19 during the transfer operation. Pivotably connected in a slot 24 in the middle of platform member 11 is telescopic hydraulic arm 13 having an extension 16 to which is connected a holding bar 15. Connected to extension 16 is one end of an arm 17, the other end of which is slideably fitted in a slot 18 of a plate 23 which is attached to platform member 11.

In the unoperated state, the hydraulic arm 13 will normally lie in the plane of platform member 11 in slot 24 and extension 16 will be retracted. In the operated state, as the scoops 12 advance towards the bobbins 19, telescopic arm 13 is extended. This causes arm 17 to rise in slot 18, and hence extract extension 16. When the scoops 12 are in position adjacent to the bobbins 19, extension 16 is retracted such that holding bar 15 drops down, and lifts the bobbins 19 away from their supports 14 in stillage 2. Bar 15 is then in the position shown by 15a, and the bobbins 19 are supported in the position indicated by chain dotting by scoops 12 and holding bar 15. The trolley is then moved away from the stillage 2, and the electric motor 8 is actuated to rotate platform member 11 and bobbins 19 through 180°. Base member 6 is driven by means, not shown, across table 22, until the bobbins 19 are located adjacent to empty cages of the carriage. Holding bar 15 is then extended, raised, and retracted and the bobbins 19 dropped into the cages, the movable pintles of the cages have been automatically withdrawn when the bobbins were positioned adjacent to the cages, are then extended into the central holes of the bobbins.

Using this type of automatic loading system enables the type of cable being manufactured on the stranding machine to be rapidly changed. All that is required, is to replace the existing stillage with one containing the requisite bobbins for the new type of cable, and to set the transfer device 3 into operation.

It is to be understood that the foregoing description of specific examples of this invention is not to be considered as a limitation of its scope.

What is claimed is:

1. A system for loading articles comprising:
   a rotatable carriage for supporting articles in selectable vertical positions around the periphery thereof;
   a storage rack for storing said articles, said rack having a plurality of stillages disposed one above another;
   a first platform positioned between said rack and said carriage;
   means for elevating said platform into alignment with selected ones of said stillages and articles; and
   transfer means riding on said platform for removing and placing said selected articles respectively from and into said selected stillages and transferring said articles for placement onto and removal from said carriage.

2. A system in accordance with claim 1, wherein said carriage includes:
   a vertical circular frame;
   a plurality of cages spacedly positioned around the periphery of said frame for receiving said articles; and
   means mounting said frame rotatably about a central axis for positioning selected ones of said cages adjacent said platform at an elevation which is in alignment with said selected stillages.

3. A system in accordance with claim 2, wherein said articles include full and empty bobbins for holding cable, said transfer means being adapted to support said bobbins for removing empty bobbins from said cages for placement into said stillages and for placing full bobbins from said stillages into said cages.

4. A system in accordance with claim 2, further including:
   a second platform positioned above said first platform;
   means for elevating said second platform into alignment between other selected ones of said stillages and cages;
   a second transfer means riding on said second platform for transferring articles between said other selected stillages and cages and removal from and placement into respective said stillages and cages.

5. A system in accordance with claim 4, wherein each of said transfer means includes wheeled trolley cars and means mounted on said trolley cars for supporting said articles.

* * * * *